United States Patent [19]
Winkler

[11] 3,769,734
[45] Nov. 6, 1973

[54] FISHING EQUIPMENT RETRIEVER
[75] Inventor: John A. Winkler, Oil City, Pa.
[73] Assignee: The Raymond Lee Organization, Inc., New York, N.Y.
[22] Filed: July 24, 1972
[21] Appl. No.: 274,589

[52] U.S. Cl................................... 43/17.2, 43/44.9
[51] Int. Cl............................................. A01k 97/00
[58] Field of Search...................... 43/17.2, 44.9, 5

[56] References Cited
UNITED STATES PATENTS
| | | | |
|---|---|---|---|
| 2,760,810 | 8/1956 | Smith | 43/17.2 UX |
| 2,807,905 | 10/1957 | Ford | 43/17.2 |
| 2,809,460 | 10/1957 | Taylor | 43/17.2 |
| 3,191,335 | 6/1965 | Sobetzer | 43/17.2 |

Primary Examiner—Louis G. Mancene
Assistant Examiner—Daniel J. Leach
Attorney—Richard S. Shreve, Jr.

[57] ABSTRACT

A first hollow cylindrical sleeve open at both ends and having an elongated slot extending in the axial direction between the ends is rotatably disposed in a second like but somewhat larger sleeve having a parallel slot. Spaced prongs are secured to one end of the first sleeve and extend outward. A separate chain is associated with each prong and is secured at one end thereto.

4 Claims, 3 Drawing Figures

PATENTED NOV 6 1973 3,769,734

FISHING EQUIPMENT RETRIEVER

FIELD OF THE INVENTION

My invention is directed toward a device which can be used to retrieve fishing plugs that have become lodged on stones, stumps and underwater snags.

SUMMARY OF THE INVENTION

The device comprises hollow concentric sleeves open at both ends, the first sleeve being disposed rotatably within the second. Both sleeves have exially extending elongated slots which extend between the ends of the corresponding sleeve. By suitable rotation of the first sleeve the two slots can be moved into and out of alignment.

A plurality of prongs or legs are disposed at one end of the first sleeve and extend outward therefrom. A like plurality of chains are employed, one end of each chain being secured to a corresponding prong, the other end of the chain being free.

In use, with slots aligned, a fishing line having a plug lodged or caught is passed through the aligned slots into the interior of the first sleeve. The first sleeve is then rotated to lock the line in place.

The device is then allowed to slide down the line to a point disposed as close to the lodged plug as possible. When the device hits the plug, its weight will help free the lodged object. The chains will get caught or tangled in the hooks of the plug whereby the plug is caught in the chains whereby the retriever and plug can be pulled up by a second line connected to the first sleeve and can be separated for reuse.

Figure 1:
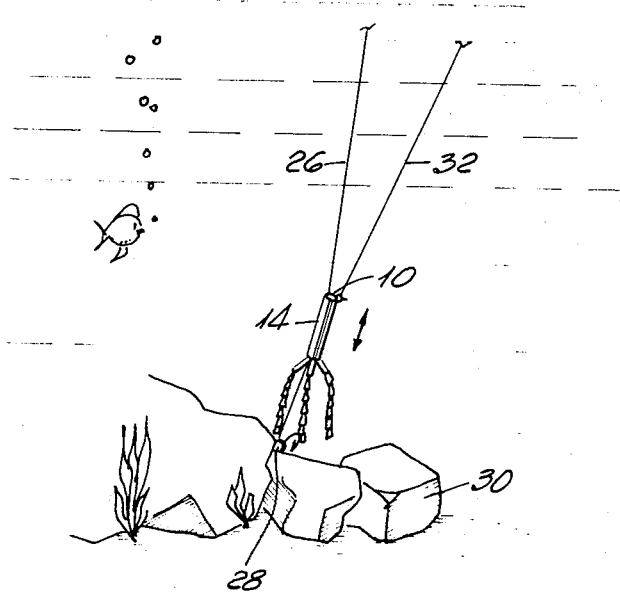
FIG. 1 is a perspective of my invention in use.
Figure 3:
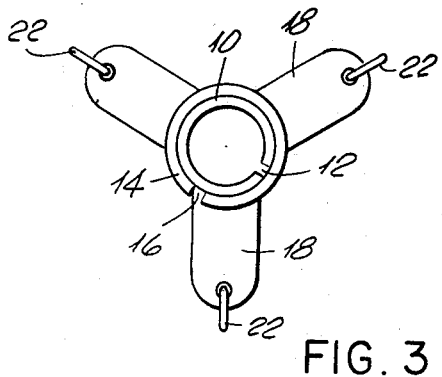
FIG. 3 is a top plan of the structure of FIG. 2.
Figure 2:
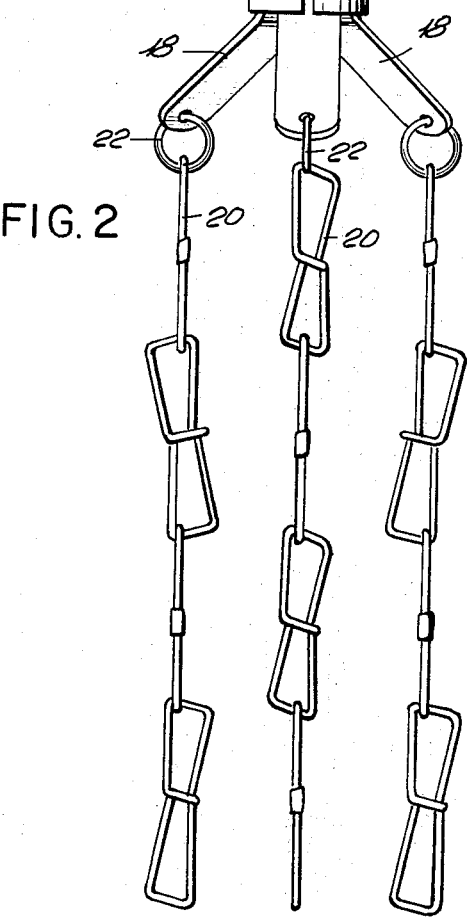
FIG. 2. is an enlarged view of my invention per se.

DETAILED DESCRIPTION OF PREFERRED EMBODIMENTS:

Referring now to FIGS. 1-3, a first hollow brass sleeve 10 open at both ends and provided with an elongated slot 12 extending between the ends in the axial direction is rotatably disposed within a second hollow brass sleeve 14 also open at both ends and provided with another elongated slot 16 also extending between the ends in the axial direction. One end of sleeve 10 has extensions formed into prongs 18 or legs which extend radially outward. A like number of chains 20 are provided. Each chain is secured at one end to a corresponding ring 22 which is connected to a corresponding prong.

A ring 24 is secured to sleeve 10 at an end opposite to that carrying the prongs. The device can then be slid down a fishing line 26 having a plug 28 caught in rocks 30 or the like. A second line 32 is secured to ring 24. The invention can then be used as previously described.

While I have described my invention with particular reference to the drawings, such is not to be considered as limiting its actual scope.

Having thus described this invention, what is asserted as new is:

1. A retriever comprising:
   a first hollow cylindrical sleeve open at both ends, one end of the first sleeve being formed into a plurality of prongs extending outward, the first sleeve having an elongated slot extending in the axial direction between the opposite ends; and
   a second hollow cylindrical sleeve disposed concentrically about the first sleeve whereby the first sleeve can be rotated within the second sleeve, said second sleeve having an elongated slot extending in the axial direction between the two ends.

2. The retriever of claim 1 wherein a ring is secured to the other end of the first sleeve.

3. The retriever of claim 2 further including a like plurality of chains, each chain being secured at one end to a corresponding prong.

4. The retriever of claim 3 wherein said one end of each chain is secured by a corresponding ring to a corresponding prong.

* * * * *